(12) United States Patent
Choi

(10) Patent No.: US 11,862,131 B2
(45) Date of Patent: Jan. 2, 2024

(54) SPACE MUSIC STAND DEVICE

(71) Applicant: Hae-Yong Choi, Seoul (KR)

(72) Inventor: Hae-Yong Choi, Seoul (KR)

(*) Notice: Subject to any disclaimer, the term of this patent is extended or adjusted under 35 U.S.C. 154(b) by 0 days.

(21) Appl. No.: 18/101,141

(22) Filed: Jan. 25, 2023

(65) Prior Publication Data
US 2023/0252961 A1 Aug. 10, 2023

(30) Foreign Application Priority Data

Feb. 7, 2022 (KR) .......................... 10-2022-0015752

(51) Int. Cl.
G10G 1/00 (2006.01)
G02B 27/01 (2006.01)

(52) U.S. Cl.
CPC ........... *G10G 1/00* (2013.01); *G02B 27/0101* (2013.01); *G02B 2027/0141* (2013.01)

(58) Field of Classification Search
CPC ................. G10G 1/00; G02B 27/0101; G02B 2027/0141
See application file for complete search history.

(56) References Cited

U.S. PATENT DOCUMENTS

| | | | |
|---|---|---|---|
| 4,779,510 A * | 10/1988 | Van den Abbeel | G10G 1/00 355/122 |
| 10,768,442 B1 * | 9/2020 | Dehkordi | G02B 30/40 |
| 11,048,081 B2 * | 6/2021 | Satoh | G02B 27/0149 |
| 11,433,815 B2 * | 9/2022 | So | B60R 1/04 |
| 2023/0088014 A1 * | 3/2023 | Landau | G09G 3/002 345/207 |

* cited by examiner

Primary Examiner — Robert W Horn
(74) Attorney, Agent, or Firm — BACON & THOMAS, PLLC

(57) ABSTRACT

The present invention relates to a space music stand device in which as an eye height of the player, a center of the semi-transparent mirror, a center of the reflector, and a center of the image monitor are configured as one optical axis a, the music sheet is viewed only to the player, and the playing view of the player is just transmitted, so that the playing is photographed while the eye of the player who views only the music sheet matches the eye of the camera without an obstacle, the audience may view the playing view of the player without an eye obstacle as in a conventional music stand, and the player may play the musical instrument while turning the music sheet page without an assistance of the separate page turner, and in order to obtain an effect such as presenting by the music sheet in the space by making the music sheet be viewed to a transparent plate, a page movement device is coupled to a body to move a page of a music sheet image provided by a monitor to a lower portion, the space music stand device includes an image monitor which is in link with a tablet PC or a computer provided to display the music sheet image at a rear end of an inside of the body, and a lower support provided in the rear of the body, and an upper support provided below the lower support so that a height is varied upward inside the lower support, and a fixture fixed to fix the height of the upper support, and a semi-transparent mirror provided in the upper support to reflect the music sheet of the image monitor toward the player.

3 Claims, 3 Drawing Sheets

SPACE MUSIC STAND DEVICE

CROSS-REFERENCE TO RELATED APPLICATION

This application claims under 35 U.S.C. § 119(a) the benefit of Korean Patent Application No. 10-2022-0015752 filed on Feb. 7, 2022, the entire contents of which are incorporated herein by reference.

BACKGROUND

(a) Technical Field

The present invention is a device representing a musical sheet on a transparent plate provided in a space, and relates to a space music stand device with a page turning device capable of turning a music sheet such that only a player can see the music sheet while turning the music sheet.

(b) Background Art

It is essential to see a music sheet in playing music or performances by singers and players. However, the music sheet is made of paper, and thus the bundle of the paper music sheets is heavy and has a high production cost, and a person who turns the pages of the music sheet next to the player whenever playing, i.e., a page turner should turn the page one by one next to the player.

Further, the number of using times of an electronic music sheet utilizing a tablet PC is increased, but even in this case, there is inconvenience that the player should turn the music sheet by touching the music sheet with a hand while playing.

With respect to a music stand for placing and viewing the music sheet, a standard area thereof is very larger as 49 cm×32 cm. Therefore, such a size almost shield an upper half body of the player.

Therefore, there is a problem in that the player continuously views the music sheet placed on the music stand positioned downward, and all players should view the music sheets by lowering their heads upon playing, and in particular, when photographing a playing scene with a moving picture or upon playing, the player or singer should match eyes of audiences, but eyes of the player who views the music sheet do not match the eyes of cameras or the audiences.

Therefore, a new technology for solving the problem is required.

SUMMARY OF THE DISCLOSURE

The present invention has been made in an effort to provide a method for solving the problem.

An exemplary embodiment of the present invention provides a space music stand device including: a body to which a page movement device is coupled in order to move a page of a music sheet image provided in a monitor at a lower portion;
an image monitor which is in link with a tablet PC or a computer provided to display the music sheet image at a rear end of an inside of the body;
a lower support provided in the rear of the body;
an upper support provided above the lower support so that a height is varied upward inside the lower support;
a fixture fixing to fix the height of the upper support; and
a semi-transparent mirror provided in the upper support to reflect the music sheet of the image monitor toward a player,
in which an eye height of the player, a center of the semi-transparent mirror, a center of a reflector, and a center of the image monitor are configured as one optical axis.

Further, a monitor intubation hole is separately provided in the rear of the body to intubate and use the image monitor such as a separate tablet PC individually carried by the player.

Further, the image monitor in which an image inversion device is provided below the semi-transparent mirror, and a page movement device are coupled.

Further, a camera support is further provided at one end of an upper support, and a position of a camera provided on the camera support is provided to be positioned on the same optical axis as a center of the semi-transparent mirror and provided so that the position may be varied.

Further, the image monitor and the semi-transparent mirror are configured as one structure, which is coupled to a variable camera support of which a length is varied in a front and rear direction, and then provided in the upper support.

According to the present invention, a music sheet image is viewed only to a player on a substrate such as transparent glass, and external audiences view a face or an expression of a player not shielded through the transparent glass. Even upon photographing a playing scene with a camera, an image music sheet is viewed only to the player and not also viewed to the camera, but a face of the player is transmitted and photographed.

Therefore, there is an effect that the music sheet is provided in a space.

Further, upper and lower portions of an image of a monitor in which upper and lower and left and right portions of the music sheet image provided in a lower portion are provided at an erect image position is reversed on a reflector, and reflected upward at 90°, and reflected on the surface of a semi-transparent mirror forward at 90 toward the player, and as a result, the erect image is implemented. Therefore, the player views the music sheet on an erect image in which upper and lower, and left and right portions are right at an eye position at which the player conveniently views the music sheet without a separate image inversion device.

Further, an eye height of the player, a center of the semi-transparent mirror, a center of the reflector, and a center of the image monitor are provided as one optical axis, and the eye of a camera provided on the same optical axial line on a rear surface of an optical axis of the semi-transparent mirror matches the eye of the player, so even though the player plays a musical instrument while viewing only the music sheet, the eye of the player automatically matches the eye of the camera.

By the same principle, since the semi-transparent mirror does not shield the face of the player, the eye of viewing the music sheet also matches the eyes of the audiences over the music sheet. That is, even though the player plays the musical instrument while viewing only the music sheet, the eye of the player can match the eye of the audience.

Further, when a right pedal is stepped by a page movement device provided in the lower portion, the page of the music sheet is provided to a next page, and when a left pedal is stepped, the previous page is provided again. Therefore, since the player can turn the music sheet while playing the musical instrument singly, the player can arbitrarily turn the music sheet without a person who turns the music sheet separately, and play the musical instrument only with a simple memory device without a heavy music sheet bundle.

That is, the music sheet image is viewed only to the player on a reflection surface of the semi-transparent mirror as illustrated in FIG. 1, and a playing view of the player is transmitted through the semi-transparent mirror and viewed to the camera or the audience, and the player can play the musical instrument while turning the music sheet with the page movement device.

Further, a monitor intubation hole is separately provided at a rear of a body, and the player is configured to intubate and use an image monitor such as a separate tablet PC, so the player can carry a personal tablet PC, and insert use the personal tablet PC in the present invention.

Further, a camera support is further provided at one end of an upper support, and the camera provided in the camera support is provided to be positioned on the same optical axis as the center of the semi-transparent mirror, and provided so that the position is varied, the player photographs a playing scene by rotating the camera support or changes the position of the camera of the camera by rotating the camera support again to play the musical instrument while viewing the audience.

Further, a configuration in which the image monitor and the semi-transparent mirror are configured as one structure, which is coupled to a variable camera support in which a length is varied in a front and rear direction, and then provided in the upper support has an advantage in that the player can view the music sheet when playing a large musical instrument having an occupancy area, such as a piano or a drum.

DETAILED DESCRIPTION

Figure 1:
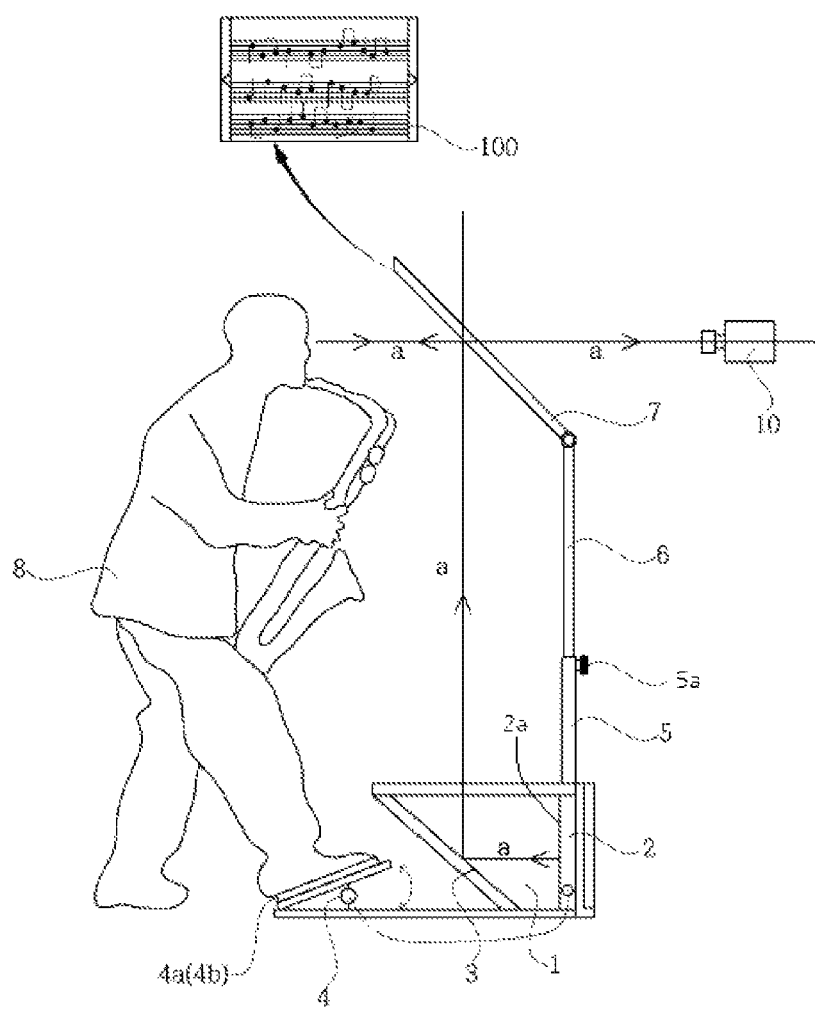
FIG. 1 is a diagram illustrating an exemplary embodiment of the present invention.
Figure 2A:
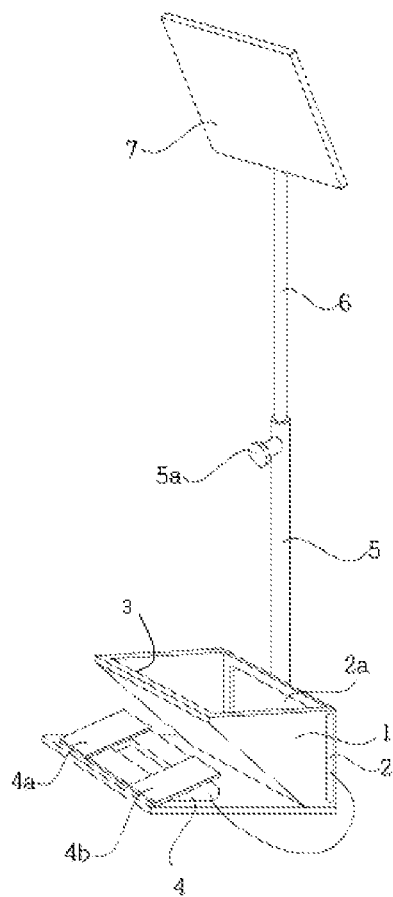
FIG. 2A illustrates an example of a use exemplary embodiment of the present invention.
Figure 2B:
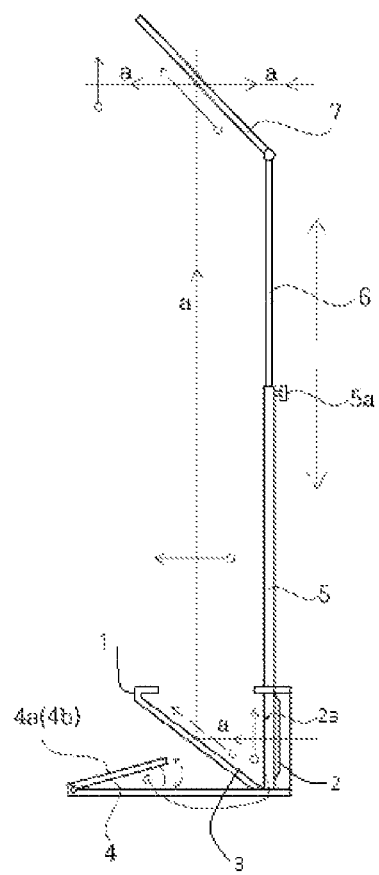
FIG. 2B is a configuration cross-sectional explanatory diagram.

FIGS. 1 and 2A are perspective views in which the present invention is carried out, and FIG. 2B is a cross-sectional configuration diagram for describing the perspective views.

As illustrated in FIGS. 1 and 2A and 2B, the present invention is configured in a form in which a body 1 is provided in a lower portion, an image monitor 2a is provided at a rear end of an inside of the body 1, and an installation direction of the image monitor 2a is configured in a form in which an erect image in which upper and lower, and left and right portions are right is viewed.

A reflector 3 reflecting at an upward 45 oblique angle is provided at a front end of the image monitor 2a and a page movement device 4 capable of an image displaying a music sheet of the image of the image monitor 2a to left and right sides is configured on a front surface portion of the body 1.

Upper and lower supports are configured upward at a rear end portion of the body 1, and a lower support 5 is provided in a lower portion of the body 1, and the lower support 5 is inserted into the body 1, and an upper support 6 of which height is varied in a vertical direction is provided, and a height fixture 5a is configured at an upper end of the lower support 5 to fix a height of the lower support 5.

A semi-transparent mirror 7 which perpendicularly reflects a music sheet image of the image monitor 2a incident on the lower reflector 3 at a 45° oblique angle toward a player 8 is configured at an upper end portion of the upper support 6.

The image monitor 2a is configured by a monitor which is combined with a tablet PC or a separate small computer having a computer function embedded therein.

The page movement device 4 is connected to a computer part of the image monitor 2a, and wiredly or wirelessly connected to be combined or separated, and used.

In the page movement device 4, when a right pedal 4b is pressed, a current page is turned to a next page of the music sheet as illustrated in FIGS. 1 and 2B, and when a left pedal 4a is stepped, the current page is turned to a previous page of the music sheet.

A structure of the semi-transparent mirror 7 is configured at the 45° oblique angle, so a part of an image which is straightly incident is transmitted and a part is reflected on an inclination surface. A transmission rate and a reflection rate are added and subtracted according to a use purpose within 80%: 20% or 20%: 80% based on 50%: 50%.

Further, as illustrated in FIG. 2A, a monitor intubation 2 is provided at the rear end portion of the body 1, so the player 8 may separately bring and mount or separately use a tablet PC with the music sheet embedded therein.

Further, when the monitor having the computer embedded therein is used, only a memory such as a USB may be brought, and mounted and used.

In general, in a structure in which there is one reflection surface, when the monitor is inverted and mounted in order to invert the upper and lower portions of the image of the monitor, and straighten the upper and lower portions, left and right portions are changed at this time.

Therefore, one side of the upper and lower portions or the left and right portions of the image should be inverted, and a separate image inversion device is required, and a resolution of the image inversion device deteriorates, and a separate power supply device and a separate expensive complicated structure should be added.

As illustrated in FIG. 2B, in the present invention, an image of which upper and lower portions are erected in the image monitor 2a is reflected upward on the reflector 3 provided at the front end of the image monitor 2a at the 45° oblique angle, and thus the upper and lower portions of the image are reversed.

While the reversed image is reflected to the player 8 perpendicularly on the reflection surface of the semi-transparent mirror 7 configured at the upper end, the upper and lower portions are erected again, and the player 8 views the reversed image as a music sheet image in which the upper and lower, and left and lower portions are erected. Therefore, the separate image inversion device is not required.

A center a of the image monitor 2a, a center a of the reflector 3, a center a of the semi-transparent mirror 7, and an eye height of the player 8 are provided on one optical axis (a) line.

Further, when a camera 10 is configured at a straight position to the eye height of the player 8, i.e., outside a rear surface of the semi-transparent mirror 7, a position of the camera 10 is also configured on the same optical (a) line as the eye height of the player 8.

In such a configuration, the eye of the player 8 matches the eye of the camera 10 even though the player 8 plays the musical instrument while viewing only the music sheet image provided in the image monitor 2a. Further, with respect to an audience which is in a remote distance, the semi-transparent mirror 7 allows the face of the player to be transparently transmitted and the music sheet image to be viewed only to the player.

As illustrated in FIG. 1, when the player 8 plays the musical instrument while viewing the music sheet of the semi-transparent mirror 7, the music sheet is viewed only to the player 8, and the external audience views the semi-transparent mirror 7 with a straight eye, so the audience may view the face and the expression of the player 8, and the eye of the player 8 who views the music sheet matches the eye of the camera 10 as it is even upon photographing the image.

That is, since the eye of the player 8 matches the eye of the camera 10 or the audience even though the player 8 views only the music sheet, an effect such as playing the musical instrument while directly viewing the camera and the audience, and a natural and a natural expression are provided.

Therefore, the player 8 may turn the music sheet while pressing the pedal of the lower body 1 while naturally viewing the music sheet and simultaneously viewing the audience or the camera 10.

That is, the player 8 may play the musical instrument while turning the music sheet page singly without a separate page tuner.

In the present invention, as illustrated in FIG. 2B, when the eye position of the player 8 matches the optical axis a which is the center of the semi-transparent mirror 7 by fixing a height fixture 5a by increasing the upper support 6 to the eye height of the player 8, the eye height of the player 8, the center of the semi-transparent mirror 7, the center of the reflector 3, and the center of the image monitor 2a match as one optical axis a.

Therefore, upper and right, and left and right portions of the music sheet image of the monitor 2a and a photographed image of the player 8 match each other, and eye of the player 8 and the eye of the photographed image match each other.

Figure 3A:
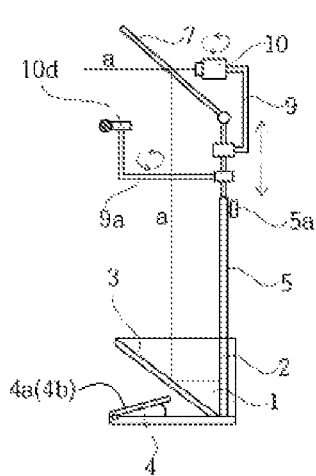
FIG. 3A is an explanatory diagram of Example 1 of an exemplary embodiment of the present invention.

The present invention further includes a camera support 9 which may include the camera 10 in a part of the upper support 6 as illustrated in FIG. 3A.

In the camera support 9, the camera 10 rotates in a vertical or horizontal direction, and the semi-transparent mirror 7 and the camera 10 are provided on the same optical axis (a) line upon photographing, and the camera 10 rotates in the horizontal or vertical direction upon non-photographing, so the camera support 9 is provided so that the camera 10 is positioned at one side thereof to prevent the camera from shielding a playing scene of the player 8.

In such a configuration, the camera support 9 is provided at one end of the upper support 6, and the camera 10 is provided to be positioned on the same optical axis a which matches a central axis a of the semi-transparent mirror 7. With respect to the position of the camera 10, the eye of the player 8 who views the music sheet matches the eye of the camera 10.

When the support is configured to rotate the camera support 8 around the upper support 6, an effect is obtained in that the player 8 executes photographing simultaneously with playing the musical instrument while turning the music sheet page and viewing the music sheet singly according to a rotational direction.

Further, as illustrated in FIG. 3A, a microphone support 9a is added to the upper support 6 and a microphone is mounted and used as necessary, and when the microphone is not used, the microphone support 9a may be rotated horizontally or vertically.

In such a structure, a singer may sing toward the audience or camera while viewing the music sheet without a separate microphone stand, and an action logic is the same as a logic of the present invention described above.

Figure 3B:
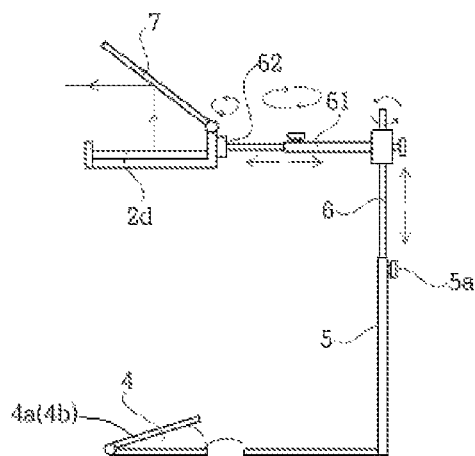
FIG. 3B is an explanatory diagram of Example 2 of an exemplary embodiment of the present invention.

Further, as illustrated in FIG. 3B, one end of the upper support 6 is rotated horizontally, and a horizontal movement stand 61 in which a length of the upper support 6 is varied is provided, and provided at the front end thereof as the tablet PC, and the semi-transparent mirror 7 is provided thereabove.

In such a configuration, when the player plays a musical instrument having a large volume, such as a drum or a piano, the player may view the music sheet image at a close position. Even though the player is separated from the music sheet, the player may turn the page of the music sheet page at the close position.

Figure 3C:
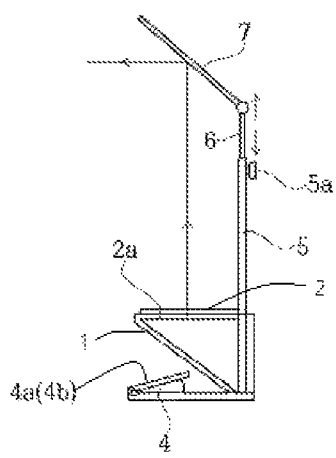
FIG. 3C is an explanatory diagram of Example 3 of an exemplary embodiment of the present invention.

As illustrated in FIG. 3C, a music sheet presenting monitor further includes an image inversion device in the configuration such as the tablet PC 2a, and is provided in link with the page movement device 4.

That is, the image monitor 2a or the tablet PC 2a is provided upward, and the image inversion device is additionally provided, so the semi-transparent mirror 7 and the page movement device 4 are combined.

Figure 3D:
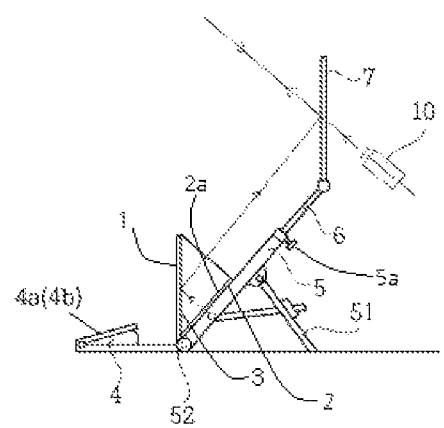
FIG. 3D is an explanatory diagram of Example 4 of an exemplary embodiment of the present invention.

As illustrated in FIG. 3D, when the player views the music sheet downward at the time of playing the musical instrument such as a violin, a slope support 51 is additionally provided at a lower end of the lower support 5, a rotation stand 52 is provided below the rear end of the body 1, and the page movement device 4 is additionally provided in front of the rotation stand 52.

The page movement device 4 includes left and right switches 4a and 4b and may be pressed with a hand, and the pedals are further provided above the left and right switches 4a and 4b to add convenience, and may be provided as a wireless device using a separate sensor when playing the musical instrument by using both hands and both feet, such as drum playing.

Therefore, in the present invention, since the music sheet is viewed only to the player and the playing view of the player is just transmitted, the playing is photographed while the eye of the player who views the music sheet matches the eye of the camera without an obstacle, and the audience may view the playing view of the player without an eye obstacle of a conventional music stand, and the player may play the musical instrument while turning the music sheet page without an assistance of the separate page turner.

What is claimed is:

1. A space music stand device presenting a music sheet in a space, comprising:
   a body (1) in which a page movement device (4) is coupled to a lower portion in order to move a page of a music sheet image, and a lower support (5) is configured in a rear;
   an image monitor (2a) provided at a rear end of an inside of the body (1) to display the music sheet image;
   a reflector (3) in which the music sheet image is reversed vertically toward a player (8) and reflected upward at 90° on a front surface of the image monitor (2a); and
   a semi-transparent mirror (7) reflecting the music sheet image reflected on the reflector (3) on the surface forward 90° toward the player (8) and providing the music sheet image as a music sheet image in which upper and lower, and left and right portions are erected,
wherein as an eye height of the player (8), a center of the semi-transparent mirror (7), a center of the reflector (3), and a center of the image monitor (2*a*) are provided as one optical axis (a),
the music sheet image is viewed to the player as an erected image in which the upper and lower, and left and right portions are right on a reflection surface of the semi-transparent mirror (7),
a playing view of the player (8) is transmitted through the semi-transparent mirror (7), and viewed to a camera (10) or an audience, and
the player (8) is configured to play a musical instrument while turning the music sheet by using the page movement device (4).

2. The space music stand device of claim 1, wherein a monitor intubation hole (2) is provided in the rear of the body (1) to intubate and use an image monitor such as a separate tablet PC.

3. The space music stand device of claim 1, wherein the page movement device (4) is combined with an image monitor including an image inversion device in the body (1).

\* \* \* \* \*